United States Patent [19]
Baker et al.

[11] Patent Number: 5,337,412
[45] Date of Patent: Aug. 9, 1994

[54] METHOD AND APPARATUS FOR SUBSTITUTING REAL AND VIRTUAL DEVICES INDEPENDENT FROM AN DATA PROCESSING SYSTEM APPLICATION PROGRAM

[75] Inventors: David C. Baker; Kathryn A. Bohrer; Greogory A. Flurry, all of Austin, Tex.; Peter Lucas, San Jose, Calif.; James R. Rhyne, Stamford, Conn.

[73] Assignee: International Business Machines Corporation, Armonk, N.Y.

[21] Appl. No.: 765,849

[22] Filed: Sep. 26, 1991

Related U.S. Application Data

[63] Continuation of Ser. No. 225,630, Jul. 27, 1988, Pat. No. 5,109,510, which is a continuation of Ser. No. 820,451, Jan. 17, 1986, abandoned.

[51] Int. Cl.$^5$ ............................................. G06F 13/00
[52] U.S. Cl. .................................. 395/275; 364/237.2; 364/244.3; 364/239.7; 364/280; 364/DIG. 1; 395/800
[58] Field of Search ................. 395/275, 700, 800, 650

[56] References Cited

U.S. PATENT DOCUMENTS

| | | | |
|---|---|---|---|
| 4,553,202 | 11/1985 | Trufyn | 364/200 |
| 4,555,775 | 11/1985 | Pike | 364/900 |
| 4,586,037 | 4/1986 | Rosener | 340/728 |
| 4,761,642 | 8/1988 | Huntzinger | 340/721 |
| 4,811,205 | 3/1989 | Normington | 395/163 |

OTHER PUBLICATIONS

O'Reilly, J. D., *Multiple Concurrent Independent Sessions on a Display Terminal*, vol. 21, No. 4, Sep. 1978, pp. 1524–1525, *IBM TDB*.

Lantz, K. A., Rashld, R. F., *Virtual Terminal Management in a Multiple Process Environment*, 1979, ACM, pp. 86–97.

Meyrowitz, Moser; Bruwin, *An Adaptable Design Strategy for Window Manager/Virtual Terminal Systems*, 1981, ACM, pp. 180–189.

*Primary Examiner*—Eric Coleman
*Attorney, Agent, or Firm*—Marilyn D. Smith; Wayne P. Bailey; Mark E. McBurney

[57] ABSTRACT

A method of, and apparatus for, running several applications concurrently on a processing system. Virtual terminals are created for running the applications. However, the virtual terminals perform as though the processing system were a single terminal system. In this way, any application written for a single terminal system can run in this multiple virtual terminal environment. For interaction with one of the several applications running on this system, the real physical resources of the system are reallocated to the virtual terminal running the selected application.

6 Claims, 4 Drawing Sheets

METHOD AND APPARATUS FOR SUBSTITUTING REAL AND VIRTUAL DEVICES INDEPENDENT FROM AN DATA PROCESSING SYSTEM APPLICATION PROGRAM

This is a continuation of application Ser. No. 07/225,630 now U.S. Pat. No. 5,109,510, filed Jul. 27, 1988, which is a continuation of application Ser. No. 06/820,451, filed Jan. 17, 1986 and now abandoned.

BACKGROUND ART

1. Field of the Invention

This invention relates to processing systems and more particularly to processing systems performing multiple tasks while sharing the same physical resources.

2. Background Art

Two types of data processing systems are known in the art. One type has a single workstation with input/output devices that communicate with its own separate processor. The other type has a plurality of workstations that share and access the same processor.

A user of either of these systems is confronted with a problem of not being able to effectuate interrupt driven events at the user's command. For example, while a user is using the system for creating a report using an editor, the user may need to interrupt the word processing session and switch instantly to another program, such as to look up a phone number that resides in a program that is different from the one the user is using as an editor.

This problem has been addressed such that a system allows the output display to share its screen with a plurality of programs at the same time. To accomplish this, the screen is divided such that each program is shown on its own portion of the output display screen. This is commonly referred to as screen sharing.

However, this method of screen sharing is expensive since a large amount of CPU cycles are required. Screen sharing is expensive because all of the multiple windows contained on the one screen must be maintained. Also, there is an additional expense in clipping the output display of the application to subscreen boundaries.

Another problem with screen sharing is that a large amount of development time is needed to write the application program in a way that it will be executable in a screen sharing environment. Also, each application must be aware that it is working in this multiple activity environment.

Screen sharing also imposes additional requirements on an application. Usually the applications have to share resources such as the screen display. The applications must also agree to the amount of screen that each application will receive. Thus, the application must know that it is working with something less than the full portion of the screen.

Another problem arises with processing systems that utilize an UNIX* operating system. UNIX operating systems allow multiple activities, thus creating a multi-process system. This is referred to as a multi-thread environment. This allows a user to run several applications at one time. However, only one application can actually interact with the terminal. If more than one application tries to interact with the terminal at the same time, there is an undesired conglomeration of output from the applications. The user must then control the output from the other applications in the background. This is called blind background processing, which is difficult to monitor.

\* UNIX is a trademark of AT&T Bell Laboratories.

One way to solve this multi-thread problem is to add physical devices to the workstation. However, it is not expedient for every task and/or virtual machine to have a unique physical terminal. The cost of multiple displays, keyboards, locators, and other interactive resources prohibits a profusion of such devices. A workstation is generally restricted to the number of devices it can support by the adaptor slot or the power limitations. The facilities such as office or desk space, electrical outlets, etc., also place constraints in the number of devices that a user can effectively use. There are additional inconveniencies in the physical movement of multiple devices. Also, refocusing of one's concentration is required when a multiplicity of interactive devices are used.

SUMMARY OF THE INVENTION

It is therefore an object of this invention to present a user interface that allows the user to switch readily back and forth between multiple activities in a multi-process system.

It is a further object of this invention to reduce the processing overhead of a multiple activity environment.

It is a further object of this invention to eliminate the need for an application program to know that it is running in a multiple activity environment while running in the processing system.

It is a further object of this invention to control the output display of multiple applications in a multi-process system.

It is a further object to minimize system cost and maximize operator convenience.

In the processing system of this invention, the physical-interactive resources are shared by a plurality of applications in a multiple thread environment with the utilization of virtual terminals. Virtual terminals provide terminal Input/Output in support of multi-tasking for an operating system running in a single virtual machine and/or multiple virtual machines. The term virtual terminal implies the appearance, to a virtual machine or several virtual machines, of more terminals than actually physically exist on the workstation.

The virtual terminals time share the physical displays, resulting in a full screen virtual terminal management subsystem. However, the implementation of time sharing does not restrict application packages from space sharing the screen of a single virtual terminal among multiple processes.

Thus the processing system of this invention opens, closes, activates, and deactivates virtual terminals as needed by applications to simulate their own actual hardware I/O devices. Hence, the applications perceive that they are in an environment that gives them the full resource. This includes the resources of the display, memory, keyboard and locator input. In other words, an entire screen is given to the application as opposed to sharing portions of the screen with other applications.

When in use, an application has total use of these resources. However, when not in use, the processing system removes these resources from the application without the applications' awareness. It does this by substituting virtual output resources to allow the application to continue execution until it requires user input.

DESCRIPTION OF THE PREFERRED EMBODIMENT

Figure 1:
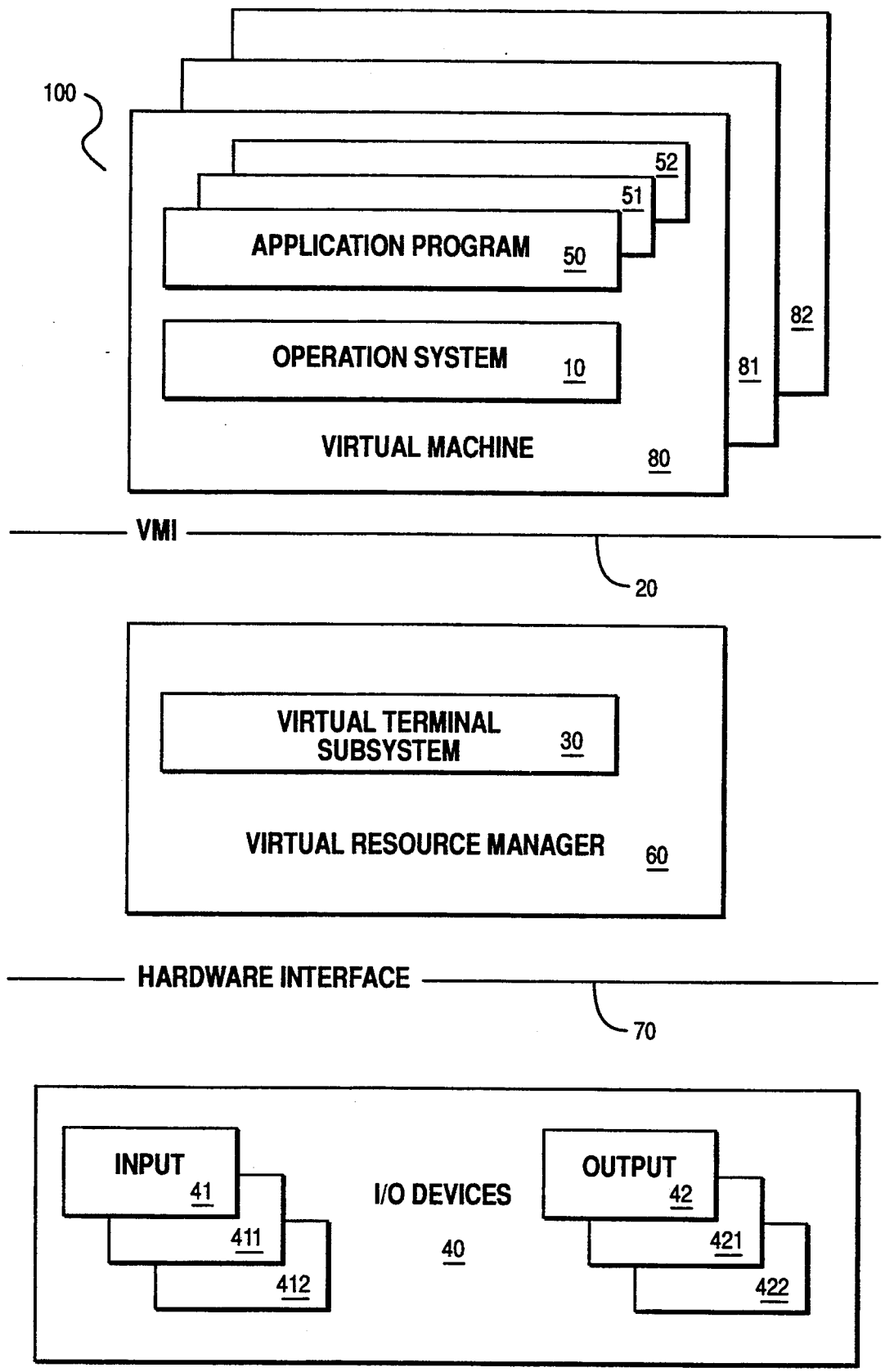
FIG. 1 shows the layers of a processing system.

FIG. 1 shows the layers of a processing system 100 of this invention. The application 50 runs on an operating system 10, such as UNIX. The next layer is the virtual machine interface 20. Next is the virtual resource manager 60 which manages all of the input/output devices 40. The virtual terminal subsystem 30 is part of the virtual resource manager 60.

In the processing system 100 of this invention, a user driven user interface switches between activities upon a command from the user. This processing system virtualizes the use of the resources 40, such that the entire resource 40 is given to an application 50 for a user's activity. This is carried out in the virtual terminal subsystem 30. The virtual terminal subsystem 30 provides terminal support for the virtual machine 80, 81, 82 environment.

Virtual terminal 330, 331, 332 (FIG. 2) provide applications 50, 51, 52 (FIG. 1) with the freedom to act as if they own the entire real terminal 40. Virtual terminals 330, 331, 332 (FIG. 2) give the virtual machines 80, 81, 82 (FIG. 1) the impression that there are more display devices 421, 422 than are physically present, that there are more input devices 411, 412 than are physically present, and that these devices have different characteristics than the physical devices 40. Also, with virtual terminals 330, 331, 332 (FIG. 2) a program 50 (FIG. 1) can be written such that it is independent of the specifics of physical terminal devices 40, e.g., display buffer organizations, presence of optional input devices, etc. Additionally, virtual terminals 330, 331, 332 (FIG. 2) relieve the programmer of developing individualized mechanisms for dealing with the limitations of the actual resources 40.

This processing system 100 allows multiple program activity at the lowest layer 60 of the system design as opposed to the application level 50 so as discussed in the Background Art section-of this application. Virtualization of terminals 330, 331, 332 (FIG. 2) is at the very base 30 of the processing system 100. In this way, any application 50 that is used in the system 100 can take advantage of multiple activities regardless of the internal structure of that particular program 50. The program 50 does not have to consider the implementation of virtual terminals 330, 331, 332, (FIG. 2), and does not know that it is being utilized in that fashion. Virtualization occurs at a fundamental layer 60 of the processing system 100 as opposed to implementing it within an application 50.

Virtualization occurs below the operating system 10 at the fundamental layer called the virtual resource manager 60. The virtual resource manager 60 is responsible for disk, memory and terminal virtualization.

Many different virtual machines 80, 81, 82 can run on the virtual resource manager 60, with each virtual machine 80, 81, 82 running a different operating system 10.

The virtual terminal model of this invention utilizes the emulation of a glass teletype, such as a keyboard send/receive (KSR) teletype, although other models could be used.

The terminal model of the preferred embodiment supports the terminal requirements for the UNIX operating system in a virtual machine environment 80, 81, 82 The UNIX operating system requires a glass teletype emulation such as the Digital Equipment Corporation VT100, or IBM 3101 which is an enhancement of the original keyboard send/receive (KSR) teletype.

The KSR terminal model is an ASCII terminal emulation in the spirit of the ANSI 3.64 standard utilizing a PCASCII code set rather than the ANSI 3.4/3.41 code sets. The ANSI 3.64 data stream is extended, as specified by the standard, to support enhanced sound generation capability,, to handle the flow of locator events, and to provide various controls to switch physical displays, fonts, and terminal characteristics.

Each virtual terminal 330, 331, 332 (FIG. 2) embodies the characteristics of a single keyboard send/receive terminal. That is, it recognizes and processes the data stream 90, 91, 92 received from the virtual machine 80, 81, 82 causing the requested actions to occur. These include moving the cursor or drawing characters onto the virtual display 350, inserting or deleting lines, clearing the screen, or changing the attributes with which characters are rendered. In addition to these actions, the outbound data stream 190 can cause the generation of sequences of continuous tone sounds, or cause the virtual display 350 to be rendered on any of the available physical displays 440.

A virtual terminal 330, 331, 332 receives input from a virtual keyboard and/or a virtual locator, and outputs to a virtual display 350. Thus the virtual terminal 330 can always expect to get input from its virtual input devices and can always output to its virtual display 350. These virtual devices may or may not have physical devices 40 (FIG. 1), 410, 420, 430, 440 (FIG. 2) allocated to them. Therefore, the virtual terminal 330, 331, 332 may not actually get input or write to a physical display. As each virtual terminal 330, 331, 332 recognizes and processes the data stream 290 inbound from the keyboard 410, it can, if requested, automatically echo various characters and simple functions back to its virtual display 350. This behavior permits the application to run as if it were using a real KSR terminal. Thus the large body of old applications require no modification to run in this virtual terminal environment.

Figure 2:
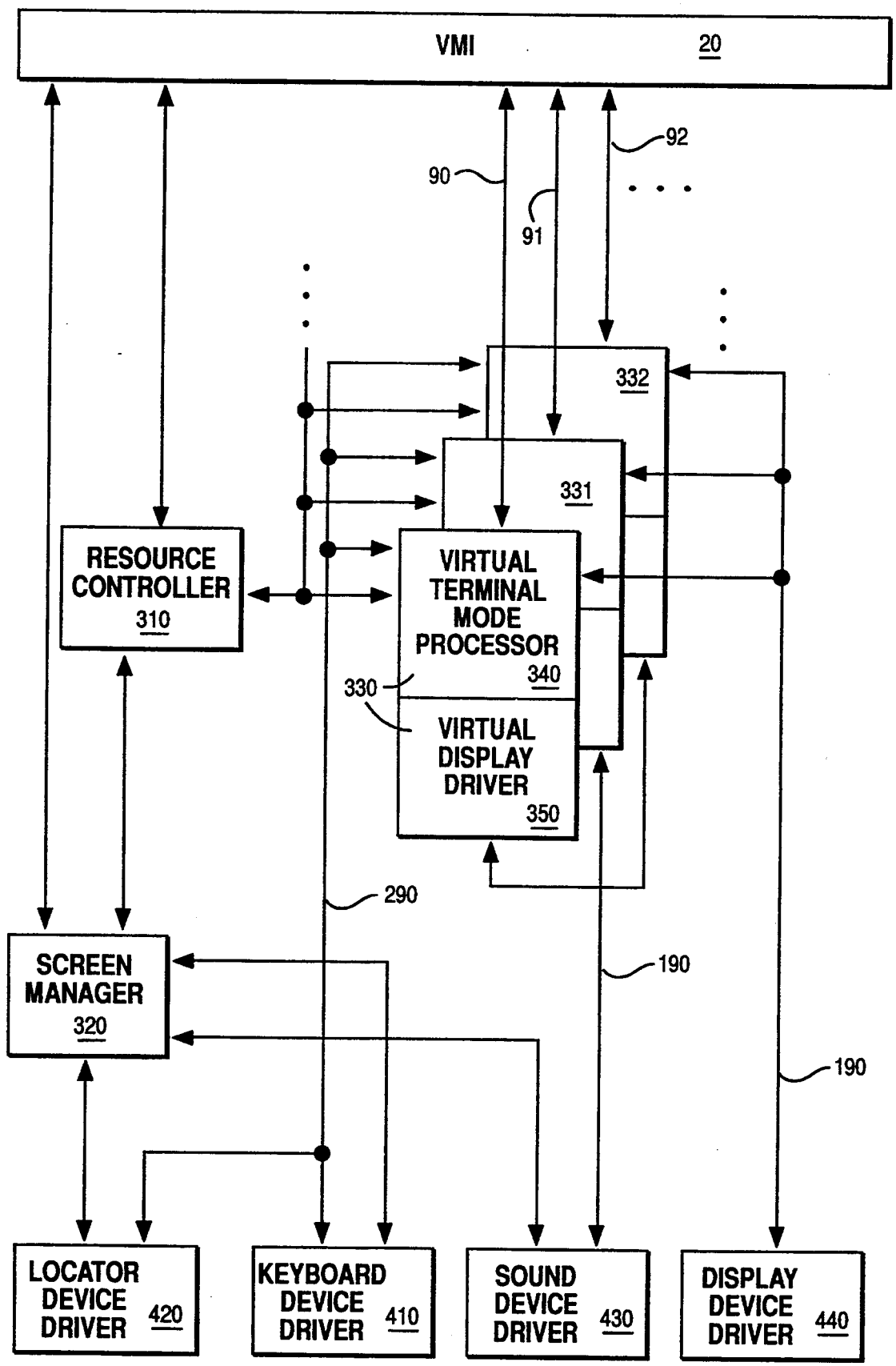
FIG. 2 shows the components of the virtual terminal subsystem.

FIG. 2 shows the components of a virtual terminal (subsystem) 30 manager within the virtual resource manager 60. The virtual machine interface 20 is the top level presented to all virtual machines 80, 81, 82 (FIG. 1) of all support for the virtual resource manager. Below the virtual machine interface layer 20 are the components of the virtual terminal manager.

The virtual terminal manager comprises a resource controller 310, a screen manager 320, a keyboard device driver 410, a locator device driver 420, a sound device driver 430, a display device driver 440, and multiple virtual terminals 330.

The resource controller 310 initializes and terminates the subsystem. It also allows a virtual machine to query and modify the configuration and characteristics of the interactive devices, the real terminal, available to the user. Furthermore, it allocates and deallocates the system resources required for the operation of a virtual terminal as it is opened and closed, i.e., created or destroyed.

The screen manager 320 performs the allocation of physical devices to the virtual devices used by the virtual terminals. The screen manager, in conjunction with the keyboard and locator device drivers, implements the time and space sharing required to virtualize these input devices. In a similar manner, the screen manager, in cooperation with the virtual display driver, implements the time sharing required to virtualize a display. At any time the display is allocated to one and only one of the virtual displays used by the virtual terminals.

The screen manager allocates all the physical devices en masse to the virtual devices of the active virtual terminal. The active virtual terminal is the terminal with which the user may interact. The active virtual terminal can actually get input and produce output on a display.

The screen manager also provides for reallocation of the physical resources. The impetus for reallocation results from either user requests or application requests. User requests are through the logical keyboard, or a similar logical mouse, allocated to the screen manager. It involves deallocating the resources from the currently active virtual terminal and the allocation to the newly active virtual terminal. This allocation requires the cooperation of both virtual terminals involved. As mentioned above, the participation of the device drivers ensures synchronization of events such as keystrokes and work request acknowledgements.

Another component of the virtual terminal manager subsystem is the keyboard device driver 410. The keyboard device driver routes input events from the real keyboard to virtual terminals based on instructions from the screen manager.

Optional components of the virtual terminal manager subsystem are the locator device driver 420, and the sound device driver 430. The locator device driver routes input events from the real locator to virtual terminals based on instructions from the screen manager. The sound device driver provides sound for the subsystem.

Also, there are from one to four display device drivers 440 which service interrupts from the display/adaptors.

The virtual terminal manager subsystem comprises from one to 32 virtual terminals. Each virtual terminal has an instance of the virtual terminal mode processor 340. The virtual terminal mode processor provides the KSR-like behavior of the virtual terminal. Each virtual terminal also has an instance of the virtual display driver 350. The virtual display driver 350 is the target of all virtual terminal mode processor outputs to the display, and virtualizes the display. Each virtual terminal also has a common device utility by which the virtual terminal mode processor communicates its resource requests to the resource controller.

VIRTUAL TERMINAL SUBSYSTEM INITIALIZATION

Initialization of the virtual terminal subsystem is performed by the resource controller First the resource controller must receive a list containing the real devices (displays, keyboard, etc.) identifiers for the various other subsystem components, fonts, and the virtual terminal defaults. Initialization requires: 1) checking the above initialization information for completeness and correctness, 2) initializing the real input devices, 3) processing the supplied fonts, 4) creating the screen manager, 5) creating the paths necessary for communication with the screen manager, 6) attaching the input devices to the screen manager, 7) attaching the screen manager to the virtual resource program check handler, and 8) initializing the global data structure shared between some components.

The resource controller initializes the subsystem in the following manner. The following routine is in program design language from which source and machine code are derivable.

```
INITIALIZE GLOBAL DATA STRUCTURE
IF THE INITIALIZATION INFORMATION NOT
    COMPLETE AND CORRECT
THEN
    PRESENT ERROR INDICATION
ELSE
    CALL INIT_DEVICES
    CALL CREATE_SM
    PRESENT SUCCESS INDICATION
    PREPARE TO SERVICE RESOURCE COMMANDS
        FROM THE OPERATING SYSTEM
```

The routine INIT_DEVICES initializes the various device drivers in the system and places the requisite information in the global data structure for use by various components. It also derives the information necessary for the system use of the fonts identified in the initialization parameter. The routine also creates communication paths from the devices to the resource controller (RC).

The routine CREATE_SM creates the screen manager (SM) process and communication paths from it to the resource controller (RC), keyboard and locator device drivers, and the operating system.

VIRTUAL TERMINAL OPEN

After initialization, the resource controller 310 is ready to accept resource requests. When a request is received from an operating system 10 to open (create) a virtual terminal step 101, (FIG. 3), the resource controller 310 takes the following steps: 1) creates the process for the virtual terminal, 2) performs the necessary functions (copy, bind) on the virtual terminal mode processor to establish a functioning process, 3) establishes communication paths to/from the virtual terminal mode processor and from/to the device drivers present, 4) assigns an external identifier to the virtual terminal, 5) attaches the virtual machine to the virtual terminal, and 6) initializes the virtual terminal process, passing the requisite information in the process initialization parameter, step 102.

The resource controller 310 opens a virtual terminal as indicated above by the following routine:

```
IF MAXIMUM NUMBER OF VIRTUAL
    TERMINALS OPEN
THEN
    INDICATE NO SUCCESS
ELSE
    CREATE_VT
    CREATE_PATHS
    INITIALIZE THE VIRTUAL TERMINAL (see below)
    TELL_SM (OPEN)
    INDICATE_SUCCESS
```

The routine CREATE_VT copies the code for the virtual terminal mode processor (VTMP), This permits each virtual terminal to have its own data and stack space, The routine then creates a process for the virtual terminal. It also creates names for internal and external (operating system) identification of the virtual terminal.

Figure 3A:
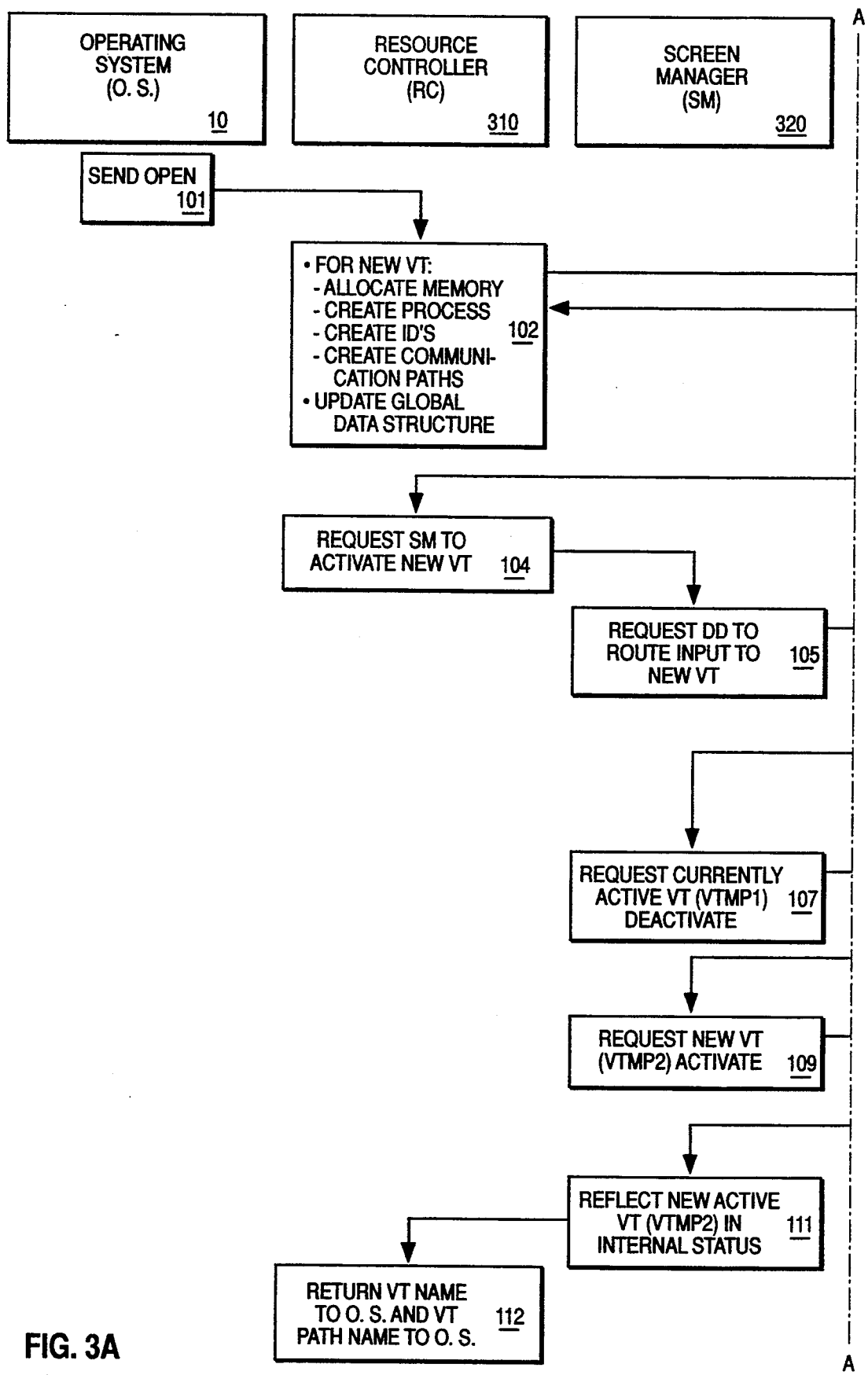
FIG. 3A and FIG. 3B shows the steps of adding operating system constructs (structure) to create virtual terminals.
Figure 3B:
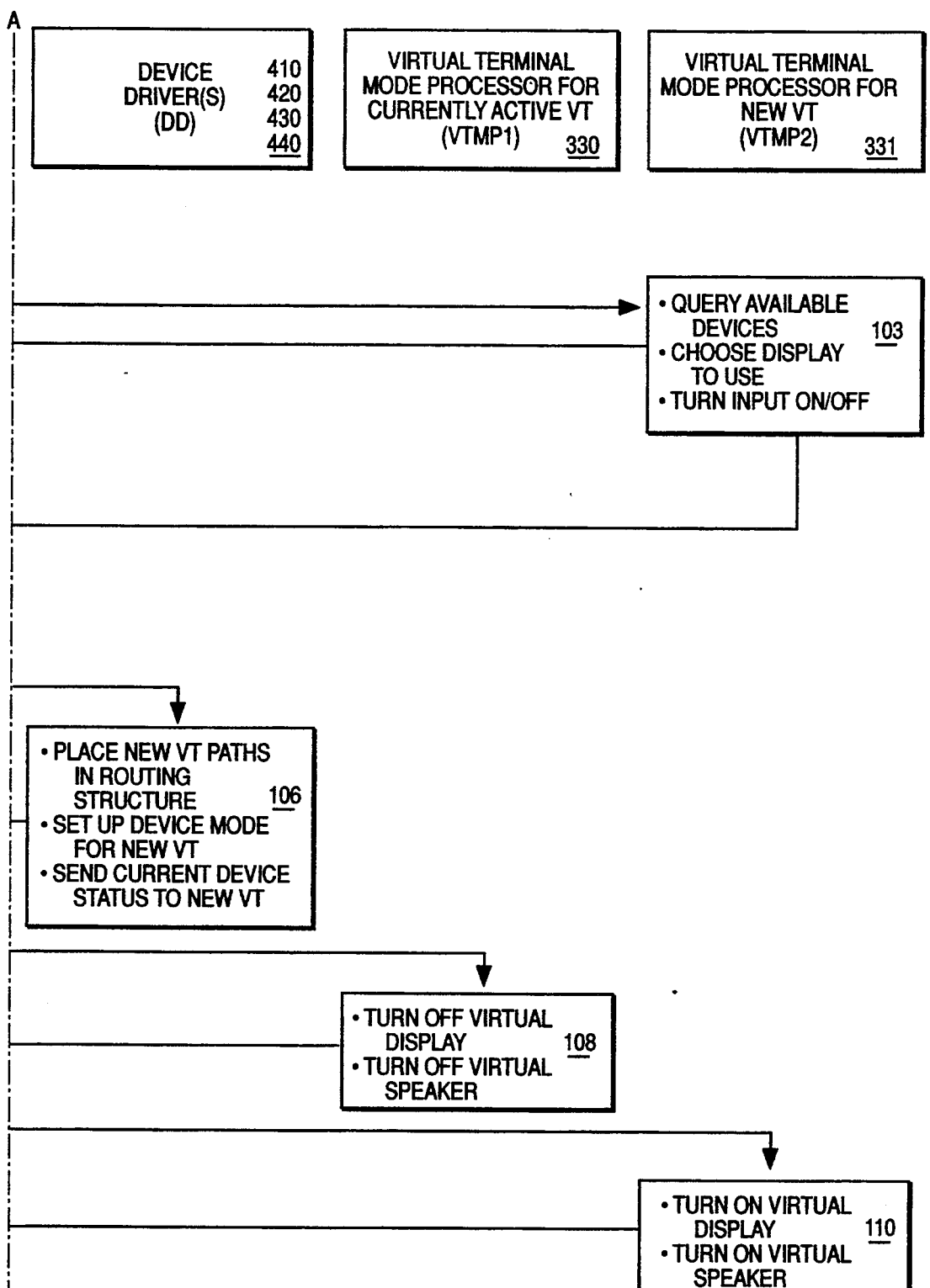

The routine CREATE_PATHS establishes communication paths to/from the virtual terminal from/to the device drivers present and the operating system that requested the open, It also establishes communication paths from the screen manager (SM) to the virtual terminal, Both CREATE_VT and CREATE_PATHS save information in the global data structure, The routine TELL_SM tells the screen manager (SM) that a new virtual terminal is opened. It sends the name of the new virtual terminal (and index into the global data structure) so the screen manager (SM) can derive needed information, The screen manager (SM) proceeds to make the virtual terminal active (see below), step 104 (FIG. 3). The routine TELL_SM waits for the screen manager (SM) to finish before allowing the resource controller (RC) to continue.

The routine INDICATE_SUCCESS returns the external identifier for the virtual terminal and a communication path from the operating system to the virtual terminal to the operating system, step 112.

The virtual terminal mode processor (VTMP) 331 must finish the initialization of the virtual terminal. After the virtual terminal is initialized, the virtual terminal mode processor performs the following routine, step 103:

```
QUERY_DEVICES
SELECT_DISPLAY
SELECT_INPUT
```

The routine QUERY_DEVICES returns the identifiers for the available devices. The routine SELECT_DISPLAY allows the virtual terminal mode processor (VTMP) to choose which of the available displays to use. The SELECT_DISPLAY function copies the virtual display driver for the chosen display and binds the copy to the virtual terminal mode processor. This allows the virtual terminal to use its virtual display independently of other virtual terminals. The virtual terminal may begin to interact with the user when it becomes active.

The routine SELECT_INPUT allows the virtual terminal mode processor (VTMP) to choose to receive or not receive input events from the keyboard and/or locator.

At this point, the operating system is able to communicate with the virtual terminal. The operating system also is able to issue screen management commands concerning the virtual terminal, if attached to the screen manager.

VIRTUAL TERMINAL CLOSE

To close a virtual terminal that has been opened by the above stated steps, either the operating system or the virtual terminal may issue a close request.

The resource controller (RC) receives the command and performs the following actions:

```
TELL_SM (CLOSE)
RECOVER_RESOURCES
INDICATE_COMPLETION
```

The routine TELL_SM sends a command to the screen manager (SM) identifying the virtual terminal to close, via the internal identifier. It waits for the screen manager (SM) to complete its duties (see below). The routine RECOVER_RESOURCES recovers all resources (storage, control blocks, etc.) used by the closed virtual terminal and removes the virtual terminal from the global data structure. The routine INDICATE_COMPLETION notifies the operating system (if it is the requestor) of completion; a virtual terminal cannot be notified because it no longer exists.

The screen manager (SM) performs the following actions while the resource controller (RC) waits:

```
COMMAND_MP(CLOSE)
NEW_VT_ACTIVE
ACK_RC
```

The routine COMMAND_MP sends a CLOSE command to the virtual terminal via the communication path between them, and waits for the virtual terminal (VTMP) to respond. The routine NEW_V_ACTIVE makes another virtual terminal active, that is, allocates the real input and output devices to that virtual terminal (see below). The routine ACK_RC communicates with the RC which allows the RC to continue its close processing.

The virtual terminal mode processor (VTMP) receives the CLOSE command and performs the following actions:

```
RELEASE_DISPLAY
ACK_SM
TERMINATE
```

The RELEASE_DISPLAY routine indicates to the virtual display driver (VDD) that it can release its resources. The ACK_SM routine allows the screen manager (SM) to continue its close processing. TERMINATE is not a routine; the virtual terminal mode processor (VTMP) terminates the virtual terminal process by returning.

VIRTUAL TERMINAL ACTIVATION/DEACTIVATION

The act of making a virtual terminal active may happen because of an open or close, or because the user has requested that another virtual terminal be made active. It requires the cooperation of the screen manager, (SM) 320, the virtual terminal mode processor (VTMP) 330 (or equivalent) for the currently active virtual terminal, the virtual terminal mode processor (VTMP) for the next active virtual terminal 331, and the input device drivers 410, 420. The screen manager (SM) 310 performs the following actions:

```
FIND_VT
COMMAND_KDD(NEW_VT)
COMMAND_LDD(NEW_VT)
COMMAND_VT(DEACTIVATE)
COMMAND_VT(ACTIVATE)
UPDATE_DATA(NEW_VT)
```

The routine FIND_VT determines what virtual terminal should be made active. The result depends on the rules for screen management and the actual command received.

The routine COMMAND_KDD sends a command to the keyboard device driver (XDD) identifying the virtual terminal to receive input from the keyboard. The routine COMMAND_LDD sends a command to the locator device driver (LDD) identifying the virtual terminal to receive input from the locator. These routines, step 105, wait for the device drivers to complete their actions before returning. The device drivers perform identical actions (see below).

The routine COMMAND_VT with the deactivate option causes the currently active virtual terminal to perform whatever actions are necessary (see below), step 107. The routine COMMAND_VT with the activate option causes the newly active virtual terminal to perform whatever actions are necessary (see below), step 109.

The routine UPDATE_DATA manipulates the screen manager's (SM's) internal structures so that it knows what virtual terminal is active, step 111.

The keyboard device driver-(KDD) and/or the locator device driver-(LDD) perform the following, step 106:

```
SET_NEW_PATH_MODES
SEND_STATUS
ACK_SM
```

The routine SET_NEW_PATH_MODES places the identifier for the communication path to the newly active virtual terminal into an internal structure. It also sets up the correct operating mode of the device for the virtual terminal.

The routine SEND_STATUS informs the virtual terminal about the current device status, i.e., what relevant keys (or buttons) are already pressed when the virtual terminal becomes active.

The routine ACK_SM allows the screen manager (SM) to continue its processing in a synchronized fashion.

The virtual terminal mode processor (VTMP) of the virtual terminal becoming inactive performs the following, step 108:

```
DEACTIVATE_VDD
NO_SOUND
```

The routine DEACTIVATE_VDD tells the virtual display driver (VDD) for the virtual terminal that it cannot write to the display, but must buffer output from the virtual terminal. The routine NO_SOUND set internal flags for the virtual terminal mode processor (VTMP) so that it does not send operating system requests for sound to the sound device driver (SDD).

The virtual terminal mode processor (VTMP) of the virtual terminal becoming active performs the following, step 110:

```
ACTIVATE_VDD
SOUND_OK
```

The routine ACTIVATE_VDD tells the virtual display driver (VDD) for the virtual terminal that it can write to the display; however, the virtual display driver (VDD) first sends the buffer it maintained to the display. Thus the user sees the most current information available from the application. The routine SOUND_OK sets internal flags for the virtual terminal mode processor (VTMP) so that it sends operating system requests for sound to the sound device driver (SDD).

At this point, the user is able to interact with the newly active virtual terminal.

Description of Operation

The virtual terminal takes input from the virtual machine in the form of output that would have been directed to the real display terminal. It virtualizes it into its instance. If the virtual terminal is the active terminal, i.e., the terminal the user is currently interacting with, then the terminal has as much real resource as it requires. It gets all of the input from the locator device driver and the keyboard device driver. Therefore the inputs from that driver will be routed to that instance of that terminal. Any sound that it generates will go to the sound device driver, and any display that it generates will be passed to a display driver, and will be presented to the user on the actual screen of the display device.

Other instances of virtual terminals that may be opened but not currently active could be getting output from a virtual machine. When they are getting this output the virtual machine interface level appears exactly the same to their virtual machine, whether they are active or inactive. Therefore, when an inactive virtual terminal gets an output request to display, instead of sending that request to a device driver, it will be virtualizing that into a device driver buffer.

This buffer is a piece of storage (RAM) to hold the current state of the display. At any instant, the virtual presentation space buffer of a virtual terminal contains the accumulated front of screen representation of all output requests sent to the virtual terminal. If the terminal gets activated by the user, the contents of the virtual device buffer will be displayed on the actual display screen.

At the time that a particular virtual terminal is given real physical display resources, it must convert the accumulated data in the virtual presentation space to real display device commands. This results in the user being able to see the current snapshot of information. In other words, when a virtual terminal is forced to relinquish its real display resources, it is conceptually similar to the user turning his head away from a real terminal for a period of time. When he turns his head back to look at it, he sees the total accumulated display modification to that point in time.

It is important that the presentation space buffer be updated even when no real devices are allocated to it. These virtualized presentation buffers are maintained in device dependent form in the display device driver component of the virtual terminal management subsystem.

The screen manager interacts with a user in the following fashion. A ring of terminals exists such that each time a virtual terminal is opened it is placed into this ring. At the time a user wants to interact with a particular terminal, and therefore a particular application, the user can hit a certain key sequence on the keyboard. This key sequence is transmitted to the screen manager by the keyboard device driver. The screen manager determines by checking the ring structure, which of the terminals currently available to the user should be made active. In this manner a user can decide which activity or which application he selects to interact with at any given time.

The activities involved in changing the activity state of a terminal involve the screen manager, the device drivers and the virtual terminals. The sequence of events is as follows. At the time the screen manager is notified that a new terminal is supposed to be made active, it sends the new routing information to an input device driver. The keyboard or locator device driver receives this information and decides that it then needs to change the routing such that input events go to the newly active virtual terminal.

Such is the case for the input devices. The output devices are handled in a slightly different fashion. The virtual terminal is notified by the screen manager that it is to become inactive. The virtual terminal itself is responsible, in the case of the sound device driver, for deciding that it can no longer send sound requests to the sound device driver to produce sound audible to the user.

For the virtual display driver there is a different mechanism. In this case, the virtual display driver is evidenced to the virtual terminal as a series of routines that can be called by the virtual terminal to produce output on the display. At the time a terminal is made inactive, it calls a routine of the virtual display driver that indicates that the terminal is inactive. In this case, when a virtual machine tries to output to a display through its virtual terminal, the virtual display driver places any information that it would send to the device in the virtual presentation space, instead. This allows the application that is using the virtual terminal to communicate with the virtual terminal as if it were still active. The terminal that is becoming active calls a routine of the virtual display driver that indicates that the terminal is active. The virtual terminal is now able to use its virtual display driver in the same manner as it would when it was inactive, but its virtual display driver is now free to actually write to the display adapter.

As a result an application using a virtual terminal, does not need to know whether it is the active or inactive virtual terminal. It can communicate with its virtual terminal at any time. Any updates it does to its display are made visible when its virtual terminal becomes active again. The application is totally unaware that its virtual terminal is inactive.

I claim:

1. A method of running concurrently a plurality of application programs on a processing system having an operating system, said method comprising:
   creating, in the operating system, a plurality of virtual terminals having a plurality of virtual output resources for running said application programs, including:
     initializing, by a resource controller of the processing system, a sublayer of the operating system for creating a plurality of virtual terminals and for managing a plurality of input and output devices;
     receiving, by the resource controller from the operating system, a request to open at least one of said virtual terminals;
     activating, by a screen manager, one of said opened virtual terminals at a time; and
     routing, by an input device driver in the operating system based on instructions from the screen manager, a plurality of input events from a real physical input device of the processing system to the active virtual terminal;
   substituting at least one of said plurality of virtual resources for at least one real physical output device allowing at least one of the application programs to continue execution with said virtual output resource wherein said application program is unaware that said application program is running in an environment of said virtual terminals;
   receiving output data from said at least one application program in an associated physical storage device; and
   resubstituting said at least one real physical output device for said at least one virtual resources, and providing said output data directly to said at least one real physical output device.

2. A method in accordance with claim 1, wherein said step of creating comprises the steps of:
   implementing, by a screen manager in conjunction with at least one input device driver of an operating system of the processing system, time sharing requirements to virtualize an input device;
   implementing by the screen manager in conjunction with at least one output device driver of the operating system, time sharing requirements to virtualize an output display device; and
   allocating, by the screen manager, each one of a plurality of real physical devices of the processing system to each virtualized device of an active virtual terminal.

3. The method of claim 2 further comprising the steps of deallocating, by the screen manager, said each one of said real physical devices of the processing system from said each virtualized device of a previous said active virtual terminal, and reallocating said each one of said real physical devices of the processing system to each of a different virtualized device of a newly active virtual terminal.

4. A method according to claim 3 wherein said step of substituting comprises the steps of:
   placing each of said opened virtual terminals in a ring structure, said ring structure logically interconnecting said opened virtual terminals;
   transmitting a key sequence from a user to a screen manager to select one of said virtual terminals in said ring structure to be activated;
   sending, by a screen manager, new routing information to an input device driver when the screen manager is notified that a new virtual terminal is to be activated; and
   changing, by the input device driver, the routing of any one of a plurality of input events to the new activated virtual terminal.

5. A method of running concurrently a plurality of application programs on a processing system having an operating system, said method comprising:
   creating, in the operating system a plurality of virtual terminals having a plurality of virtual output resources for running said application programs, including:
     initializing, by a resource controller of the processing system, a sublayer of the operating system for creating a plurality of virtual terminals and for managing a plurality of input and output devices;
     receiving, by the resource controller from the operating system, a request to open at least one of said virtual terminals;
     activating, by a screen manager, one of said opened virtual terminals at a time; and
     routing, by an input device driver in the operating system based on instructions from the screen manager, a plurality of input events from a real physical input device of the processing system to the active virtual terminal implementing, by said screen manager in conjunction with at least one input device driver of the operating system, time sharing requirements to virtualize an input device;

implementing, by the screen manager in conjunction with at least one output device driver of the operating system, time sharing requirements to virtualize an output display device; and allocating, by the screen manager, each one of a plurality of real physical devices of the processing system to each virtualized device of an active virtual terminal;

substituting at least one of said plurality of virtual resources for at least one real physical output device allowing at least one of the application programs to continue execution with said virtual output resource wherein said application program is unaware that said application program is running in an environment of said virtual terminals;

receiving output data from said at least one application program in an associated physical storage device;

resubstituting said at least one real physical output device for said at least one virtual resources, and providing said output data directly to said at least one real physical output device;

deallocating, by the screen manager, said each one of said real physical devices of the processing system from said each virtualized device of a previous said active virtual terminal; and reallocating said each one of said real physical devices of the processing system to each of a different virtualized device of a newly active virtual terminal.

6. A method according to claim 5 wherein said step of substituting comprises the steps of:

placing each of said opened virtual terminals in a ring structure, said ring structure logically interconnecting said opened virtual terminals;

transmitting a key sequence from a user to a screen manager to select one of said virtual terminals in said ring structure to be activated;

sending, by a screen manager, new routing information to an input device driver when the screen manager is notified that a new virtual terminal is to be activated; and changing, by the input device driver, the routing of any one of a plurality of input events to the new activated virtual terminal.

* * * * *